May 3, 1927.
A. H. STEWART
1,627,211
BASE FRAME FOR PRIMARY EDUCATIONAL WORK AND PLAY
Filed Jan. 5, 1925  2 Sheets-Sheet 2
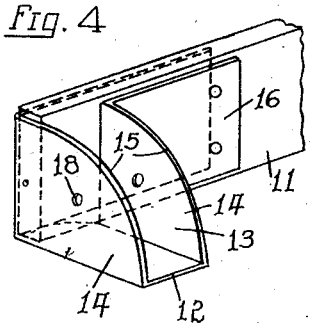
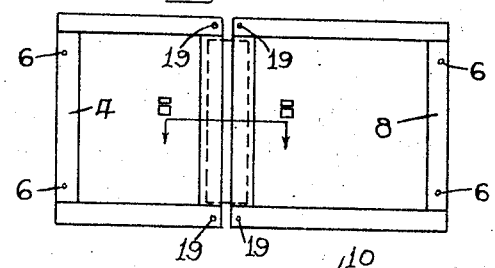
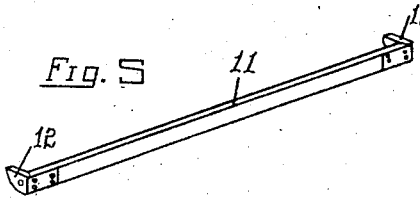
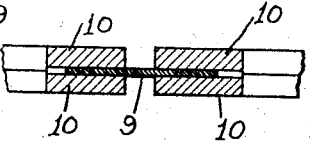
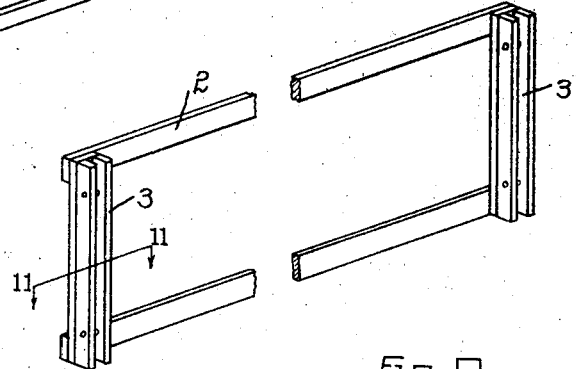
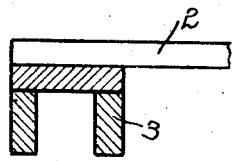
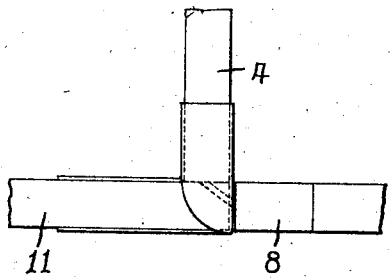
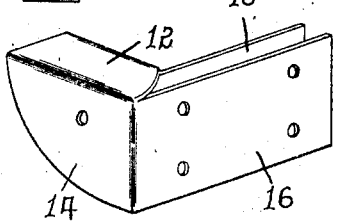

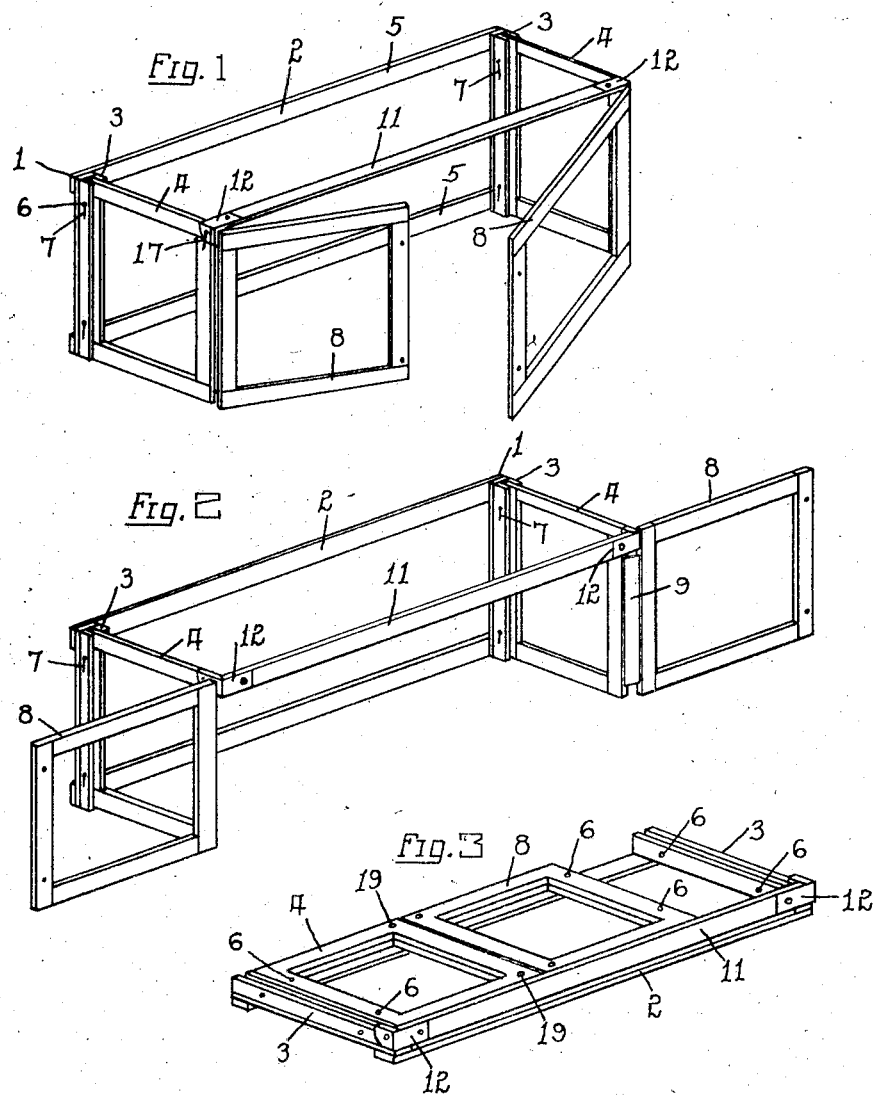

Patented May 3, 1927.

1,627,211

UNITED STATES PATENT OFFICE.

ANNE H. STEWART, OF CLEVELAND, OHIO.

BASE FRAME FOR PRIMARY EDUCATIONAL WORK AND PLAY.

Application filed January 5, 1925. Serial No. 656.

My invention has for its object to provide a base frame for securely supporting readily placable sheets of material that are adapted to be decorated or delineated to form a suitable back ground or atmosphere of an artistic or practical nature for representative objects which will make more real the concepts of children and inspire their imaginations and efforts to produce a great variety of progressively improving artistic and realistic effects.

My invention enables the younger pupils to render tangible their ideas, which is exceedingly gratifying and has found to be a great reward for their efforts. It results in the production of a rapid advancement in their powers of observation, develops skill of production of their concepts in realistic form and, consequently, increases the rate of acquisition of knowledge by younger pupils.

The invention provides a frame that may be assembled to form an enclosure and which is provided with parts for varying the field or stage of operations of the pupil, or that may be used cooperatively to produce varying effects in an artistic or realistic sense. The frame may be made of such size as to enable same to be placed on a desk, or table or the like, or may be made of larger size for placement on the floor and to accommodate the pupil on its interior. In the preferred embodiment of my invention I provide a collapsible frame having rear and side parts, and winged parts that may be used as a closure for the assembled structure or may be used as flies that may be located at different angles with respect to the side parts of the frame to produce desired effects. The invention also provides a tie bar for completing the top of the frame, and securing the winged members in relation to the assembled structure when the bar is in one position so as to quite rigidly sustain the winged parts in the said relation or to permit free movements of the winged parts and yet sustain the end parts of the structure when the winged parts are so moved, whereby the assembled structure may be closed or opened by the movements of the winged parts.

The invention may be contained in structures that in their details may vary. To illustrate a practical application of the invention I have selected a structure as an example of structures containing the invention and shall describe it hereinafter. The structure selected as an illustration is shown in the accompanying drawings.

Figure 1 of the drawings is, substantially, a perspective view of the assembled frame when the tie bar is in one position. Fig. 2 illustrates the assembled frame when the tie bar is in a second position. Fig. 3 illustrates the parts collapsed and assembled for storage purposes. Fig. 4 illustrates an enlarged view of the end portion of the tie bar used for completing the assembled frame. Fig. 5 is a perspective view of the tie bar. Fig. 6 is a view of a locking clip secured to the end of the tie bar. Fig. 7 illustrates end and winged parts of the frame. Fig. 8 is a view of the section taken on the plane of the line 8—8 indicated in Fig. 7. Fig. 9 shows a broken view of a corner of the frame that may be formed between the end and winged parts of the frame. Fig. 10 is, substantially, a perspective view of the back part of the frame. Fig. 11 is a view of a section taken on the plane of the line 11—11 as indicated in Fig. 10.

The frame embodying my invention is preferably formed of wood whereby card board or paper may be readily attached to the sides of the frame by securing the paper or card board with thumb tacks either on the inside or the outside of the frame as may be desired in order to produce in tangible form the ideas that may be conceived or developed by the pupil. The card board or other sheet of material may be suitably decorated or may be depicted with representative scenes or representative parts of a structure as may be desired. The assembled structure thus provides a confining area where the problems presented by a concept of the child may be solved and his ideas of arrangement of parts or of form or configuration may be, in a miniature way, realized. In order that the frame may be rendered collapsible, which is essential where a large number of pupils are being guided in their work of producing in tangible form their ideas, the frame is formed of separable parts that may be readily connected and disconnected for the purposes of setting up or collapsing the frame. Thus the frame 1 is provided with a rear or back part 2 that is provided with suitable channeled members 3 preferably formed of wood located at the ends of the part 2 for receiving the end parts 4 of the frame. The back part is thus formed of a pair of bars 5 that may be secured to the ends of the channel parts 3. The sides of the end parts 4 and the channeled parts 3 are provided with openings 6 that register when the sides of the end parts 4 are located in the channeled parts 3 and through which a soft wire 7 may be inserted and bent to efficiently secure the end parts 4 in position. The channeled members 3 are preferably so formed as to locate the end parts 4 at right angles to the back part 2. The end parts 4 are also preferably formed of wooden bars or strips that are suitably secured at their ends to form a rectangular shaped end, that may be substantially square in configuration.

Winged parts 8 are connected to the end parts 4 by means of suitable hinges. Each hinge is formed of fabric, such as the strip of canvas 9, that is connected to an end part and to a winged part. The winged parts 8 are also formed of bars secured at their ends and the winged parts are formed substantially rectangular in shape. The adjoining side bars of the end parts 4 and of the winged parts 8 are made double and the fabric 9 in each case is secured between the bars 10 that form juxtaposed bars of the end parts and the winged parts. The length of the portions of the fabric between the double bars is substantially that of the hypothenuse of a right triangle whose base and altitude are the thickness of each of the bars 10 in order that the winged parts may be swung to positions extended at right angles to the end parts and so as to extend in directions on opposite sides of the end parts and yet secure and retain the winged parts in these extreme positions as well as intermediate positions and prevent movements to a material degree beyond the right angular relation to the end parts.

The end parts 4 are not only secured in their positions by the channeled parts 3 but they are also tied together by means of the tie rod 11 which is provided at its ends with a pair of angular locking clips 12 that may be placed over the upper forward corners of the end parts 4 and so as to position the tie rod 11 on the top edges of the end parts 4 or to support the tie rod 11 along the forward edges of the end parts 4 at the upper forward corners of the end parts 4. The clips 12 are each formed of sheet metal pieces bent to form a socket 13 to receive the corners of the end parts 4. The socket 13 is formed by bending portions from the plane of the sheet metal from which the clips are formed, to produce the flanges 14 having preferable the curved edges 15. The flanges 14 have portions 16 that extend at right angles thereto and in parallel planes located at a distance apart substantially equal to the thickness of the tie rod 11.

The ends of the tie rod 11 are located between the portions 16 of the clips and are secured in position by rivets or nails that pass through the portion 16 and the tie rod. Thus the clips form socket members that extend at right angles to the tie rod, the portions 14 being located in planes that are separated a distance substantially equal to the thickness of the end parts of the frame. The corners of the end parts may be inserted in the socket 13 to sustain the tie rod 11 and at the same time hold the end parts in parallel relation to each other or in such a definite relation as may be determined by the relative position of the channeled parts 3. Thus the tie rod 11 may be so positioned that the clips, that is, the bottom of the sockets 13 will rest upon the upper edges of the end parts 4 at the forward upper corners of the end parts, and the ends of the tie rods will be located against the edges of the end parts at the forward upper corners. This places the ends of the tie rod in the plane of the winged parts 8 that are open and operates to hold the winged parts substantially in a plane extending across the front of a vertical frame. This operates to maintain the end parts in extended position. The tie bar may be locked in position by a soft wire 17 that may be inserted through the holes 18 formed in the clips 12 and the holes 19 formed in the corners of the end parts.

If desired the tie rod 11 may be so supported as to not only secure the end parts in their relative position, but also so as to permit free hinged movements of the winged parts. This may be done by turning the tie rod 11 end for end and place it in the position illustrated in Fig. 1, when the clips will extend downward over the upper forward corners of the end parts. The holes 18 and 19 located in the clips and the end parts being so positioned that they will register whether the tie rod is supported against the forward edges of the end parts or on the top edges of the end parts. Thus the soft wire 17 may be inserted when the tie rod 11 is in either position.

If desired to produce a deeper stage for the operations of the pupil or for the presentation of his concepts the winged parts 8 may be used for the end parts, also if it is desired the end parts and the winged parts may be combined to form a rectangular enclosing frame for any purpose that may be of use to the pupil.

When the frame is to be stored it may be collapsed by removing the tie rod and withdrawing the wires and the parts may be conveniently piled together as shown in Fig. 3.

I claim:—

1. An educational device including a frame having a rear, ends extending outwardly at an angle to the rear and connected thereto, wings hinged to the ends, a tie rod, and means carried by the tie rod for engagement with said ends of the frame, said means being formed so as to engage the ends and hold the tie rod in one position of the rod to permit hinging movement of the wings and in a second position of the rod to engage the wings and hold the latter in a predetermined position.

2. An educational device including a frame having a rear, ends extending outwardly at an angle to the rear and connected thereto, wings hinged to the ends, a tie rod, and channeled angular clips carried by the tie rod and receiving the ends of the rod in one of their arms and having their other arms formed to receive the ends of the frame so as to hold the tie rod in one position above the tops of the wings and in a second position of the rod to engage the wings to prevent movement of the latter.

3. In a collapsible device for educational purposes, a frame having a rear, channeled members carried by the end portions of the rear, ends receivable at their rear edges in the channels of said members, wings hinged to the ends, a tie rod, and means to removably connect the front portions of the ends f the tie rod to the ends.

4. In a collapsible device for educational purposes, a frame having a rear, channeled members carried by the rear, ends removably receivable at their rear edges in the channels of said members, wings hinged at their rear edges to the front edges of the ends and having their front edges removably receivable in the channels of the members upon removal of the ends, and means common to both the ends and the wings to interchangeably secure either in the channels of said members.

In testimony whereof I have hereunto signed my name to this specification.

ANNE H. STEWART.